UNITED STATES PATENT OFFICE 1,950,516

PHENOPLASTIC AND METHOD OF PREPARING SAME

Carl F. Prutton, Cleveland, Ohio, assignor to The Dow Chemical Company, Midland, Mich., a corporation of Michigan No Drawing. Application June 21, 1929, Serial No. 372,794

23 Claims. (Cl. 260—4)

The present invention relates to plastics; particularly to phenolic condensation products similar to bakelite, suitable for molding and other uses; more particularly to resinous substances prepared from phenolic bodies and halogenated organic compounds; and still more particularly to such products obtained by interaction of alkali-metal salts of phenolic bodies and methylene dichloride.

An object of the invention is to provide a simplified and more economical method than heretofore known, employing available less costly raw materials and avoiding certain steps in the preliminary preparations of raw materials incident to present processes. Other objects will be manifested as the description proceeds. The invention, then, consists of the steps and new products hereinafter fully described and particularly pointed out in the claims, the following description setting forth but several of the various ways in which the principle of the invention may be used.

As raw materials in my process, I may use a halogenated organic compound such as methylene dichloride, which I react with sodium phenate under preferred conditions, producing thereby a phenoplastic, or phenolic condensation product, as illustrated in the following reaction:—

I. 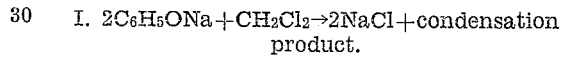

product.

The components are preferably used in the theoretical ratio indicated, i. e. approximately two moles of phenate to one of methylene dichloride, of two moles of said phenate per mole of halogen.

I have found that the aforesaid reaction may be carried out either with or without the aid of a catalyst, the latter being used if desired for the purpose of increasing the rate of reaction. Catalysts of basic type, e. g. ammonium carbonate or caustic soda, have been used with good results.

The aforementioned components in approximately the given proportions are heated with water, with or without a catalyst, usually under pressure, to temperatures in general below 300° C. for the desired period of time. The product may then be separated from any excess starting materials and by-products and dried.

The resinous condensation substance herein obtained is a gum which is plastic while hot and brittle when cold. In order to wash out by-product salt or other undesirable soluble components, the gum is worked hot in the presence of water, as is crude rubber, or it may be crushed to a powder or granular solid in the cold and washed after which it may be dried, then being ready for use.

The dried gum or resin may be molded either pure or admixed with other materials, such as wood flour, pigments, dyes, metallic powders, mica or other substances suited to the use intended, according to the usual methods. Furthermore, it is within the scope of my invention to modify the conditions and/or proportion of components so as to prepare products suitable for use in coating compositions such as varnishes or lacquers, said scope being intended to embrace not only the compositions, products and methods of preparing same, but also the derived uses.

A preferred manner in which the invention may be carried out is illustrated in the following specific example; it being understood, however, that such example is not to be construed as a limitation upon the invention.

Example 1

A mixture comprising 10 grams flake sodium phenate, 5 grams methylene dichloride, 0.5 gram ammonium carbonate and water is heated under pressure, to a temperature of 150° to 190° C. for 6 hours. The reaction mixture is then acidified, followed by steam distillation, after which the reaction product is washed, dried and powdered.

The resinous condensation product may then be molded by any suitable procedure after the addition of any preferred ingredients.

With reference to the specific case wherein sodium phenate and methylene dichloride are the ingredients, it may be stated that phenol, which is largely used in the production of phenolic condensation products, is now largely derived from sodium phenate as an intermediate and by using the sodium phenate, I avoid the steps and cost of producing phenol therefrom. Furthermore, sodium phenate solution may be used, thus eliminating evaporation costs. Formaldehyde which is also used in the preparation of said condensation products, may be made from methylene dichloride. However, by employing the dichloride instead of formaldehyde, I avoid the steps and costs of transforming the dichloride into formaldehyde. It is accordingly obvious that by starting with sodium phenate, which is an intermediate in the commercial production of phenol, and halogenated organic compounds convertible into formaldehyde, I eliminate certain steps heretofore required in the preparation of such plastics whereby the cost of production thereof is markedly lowered and the process simplified.

I do not limit my invention to the particular ingredients as above mentioned. Sodium phenate may be considered as a specific example of a metal salt, e. g. an alkali or alkaline-earth metal salt, of the more general class of hydroxy or phenolic bodies which includes cresols, naphthols, hydroxy-diphenyls, hydroxy-aromatic carboxylic acids, aromatic alcohols and polyhydroxy compounds. Methylene dichloride is but a specific example of a more general class of organic compounds, such as benzal chloride, ethylidene chloride, and acetylene tetrachloride, which are polyhalogenated on at least one carbon atom, said halogens being substitutable by hydroxyl or equivalent groups. A type reaction representing the application of the more general classes follows:—

II.  2 ROM+R″ 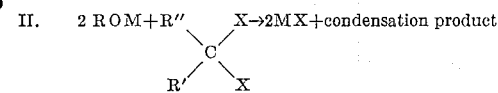 X→2MX+condensation product where R represents an aromatic radical which may or may not be substituted with other groups such as alkyl or halogen, R' an aliphatic residue or hydrogen, R″ either a hydrocarbon group or chain, or hydrogen, M a metal, preferably an alkali-metal, and X represents a halogen.

By the term "insoluble, infusible body" mentioned in the claims, I mean a substance that is relatively insoluble in ordinary solvents, is relatively indifferent to ordinary acids which are not too concentrated, and which char when heated to comparatively high temperatures, without first fusing.

Other modes of applying the principle of my invention may be employed instead of the one explained, change being made as regards the materials employed, provided the ingredients stated by any of the following claims or the equivalent of such stated ingredients be employed.

I therefore particularly point out and distinctly claim as my invention:—

1. In a method of making a plastic composition, the step which consists in reacting between methylene dichloride and aqueous sodium phenate.

2. In a method of making a plastic composition, the step which consists in heating together methylene dichloride and aqueous sodium phenate under pressure at temperatures below 300° C.

3. In a method of making a plastic composition, the step which consists in heating together methylene dichloride and aqueous sodium phenate under pressure at temperatures below 300° C. in presence of a basic compound capable of catalyzing the reaction.

4. In a method of making a plastic composition, the step which consists in heating together methylene dichloride and aqueous sodium phenate under pressure at temperatures below 300° C. in presence of ammonium carbonate as catalyst.

5. An amorphous condensation product resulting from the reaction between sodium phenate, methylene dichloride in the molecular proportions of 2 and 1, respectively, and water.

6. A method of making a phenoplastic which comprises reacting a polyhalogenated hydrocarbon having the following general formula:— R'CHX₂, wherein R' represents a substituent from the group consisting of hydrogen and a hydrocarbon residue, and X represents halogen, with a phenolic salt having the general formula, R—O—M, wherein R represents an aromatic residue and M represents a metal selected from the group consisting of alkali- and alkaline-earth metals, said reaction being carried out in the presence of water.

7. A method of making a phenoplastic which comprises reacting a polychlorinated hydrocarbon having the following general formula:—R'CHCl₂, wherein R' represents a substituent from the group consisting of hydrogen and a hydrocarbon group, with an alkali-metal phenate in the presence of water.

8. A method of making a phenoplastic which comprises reacting a polychlorinated hydrocarbon having the following general formula:— R'CHCl₂, wherein R' represents a substituent from the group consisting of hydrogen and a hydrocarbon group, with an alkali-metal phenate in the presence of water, under pressure in the presence of a basic compound capable of catalyzing the reaction, the molecular ratio of the chloro and phenate compounds being 1 to 2, respectively.

9. In a method of making a plastic composition, the step which consists in reacting a polyhalogenated hydrocarbon, having the general formula

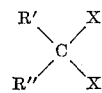

wherein R' and R″ represent hydrogen and/or hydrocarbon residues and X represents halogen, with aqueous phenolic salt, said phenolic salt having the general formula, R—O—M, wherein R represents an aromatic residue and M represents a metal selected from the group consisting of alkali- and alkaline-earth metals.

10. In a method of making a plastic composition, the step which consists in reacting a polyhalogenated hydrocarbon, having the general formula

wherein R' and R″ represent hydrogen and/or hydrocarbon residues and X represents halogen, with aqueous phenolic salt, said phenolic salt having the general formula, R—O—M, wherein R represents an aromatic residue and M represents an alkali metal.

11. In a method of making a plastic composition, the step which consists in reacting a polyhalogenated hydrocarbon, having the general formula

wherein R' and R″ represent hydrogen and/or hydrocarbon residues and X represents halogen, with aqueous alkali-metal phenate.

12. In a method of making a plastic composition, the step which consists in reacting a polyhalogenated hydrocarbon, having the general formula

wherein R' and R″ represent hydrogen and/or hydrocarbon residues and X represents halogen, with aqueous phenolic salt, said phenolic salt having the general formula, R—O—M, wherein R represents an aromatic residue and M represents a metal selected from the group consisting of alkali- and alkaline-earth metals, the polyhalogenated hydrocarbon and phenolic salt being employed in approximately the ratio of 1 mole of the former to 2 moles of the latter.

13. In a method of making a plastic composition, the step which consists in reacting a polyhalogenated hydrocarbon, having the general formula

wherein R' and R'' represent hydrogen and/or hydrocarbon residues and X represents halogen, with aqueous phenolic salt, said phenolic salt having the general formula, R—O—M, wherein R represents an aromatic residue and M represents an alkali-metal, the polyhalogenated hydrocarbon and phenolic salt being employed in approximately the ratio of 1 mole of the former to 2 moles of the latter.

14. In a method of making a plastic composition, the step which consists in reacting a polyhalogenated hydrocarbon, having the general formula

wherein R' and R'' represent hydrogen and/or hydrocarbon residues and X represents halogen, with aqueous alkali-metal phenate, the polyhalogenated hydrocarbon and alkali-metal phenate being employed in approximately the ratio of 1 mole of the former to 2 moles of the latter.

15. In a method of making a plastic composition, the step which consists in heating, under pressure and in the presence of a basic compound capable of catalyzing reaction, a polyhalogenated hydrocarbon, having the general formula

wherein R' and R'' represent hydrogen and/or hydrocarbon residues and X represents halogen, with aqueous phenolic salt, said phenolic salt having the general formula, R—O—M, wherein R represents an aromatic residue and M represents a metal selected from the group consisting of alkali- and alkaline-earth metals.

16. In a method of making a plastic composition, the step which consists in heating, under pressure and in the presence of a basic compound capable of catalyzing reaction, a polyhalogenated hydrocarbon, having the general formula

wherein R' and R'' represent hydrogen and/or hydrocarbon residues and X represents halogen, with an aqueous phenolic salt, said phenolic salt having the general formula, R—O—M, wherein R represents an aromatic residue and M represents an alkali-metal.

17. In a method of making a plastic composition, the step which consists in heating, under pressure and in the presence of a basic compound capable of catalyzing reaction, a polyhalogenated hydrocarbon, having the general formula

wherein R' and R'' represent hydrogen and/or hydrocarbon residues and X represents halogen, with an alkali-metal phenate and water, the polyhalogenated hydrocarbon and alkali-metal phenate being employed in approximately the ratio of 1 mole of the former to 2 moles of the latter.

18. An amorphous condensation product resulting from the reaction between water, a phenolic salt, having the general formula, R—O—M, wherein R represents an aromatic residue and M represents a metal selected from the group consisting of alkali- and alkaline-earth metals, and polychlorinated hydrocarbon, having the general formula

wherein R' and R'' represent hydrogen and/or hydrocarbon residues, such product being transformable through the agency of heat into an insoluble, infusible body.

19. An amorphous condensation product resulting from the reaction between water, a phenolic salt, having the general formula, R—O—M, wherein R represents an aromatic residue and M represents an alkali-metal and a polychlorinated hydrocarbon, having the general formula

wherein R' and R'' represent hydrogen and/or hydrocarbon residues, such product being transformable through the action of heat into an insoluble, infusible body.

20. An amorphous condensation product resulting from the reaction between water, an alkali-metal phenate, and a polychlorinated hydrocarbon, having a general formula

wherein R' and R'' represent hydrogen and/or hydrocarbon residues, such product being transformable through the action of heat into an insoluble, infusible body.

21. An amorphous condensation product resulting from the reaction between a phenolic salt having the formula, R—O—M, wherein R represents an aromatic residue and M represents a metal selected from the group consisting of alkali- and alkaline-earth metals, and a polychlorinated hydrocarbon having the formula, R'—CHCl₂, wherein R' represents a member of the group consisting of hydrogen, alkyl, and hydrocarbon-substituted alkyl groups, such product being substantially free from a free phenol, and being transformable by heat into an infusible, insoluble body.

22. An amorphous condensation product resulting from the reaction between a phenolic salt having the formula, R—O—M, wherein R represents an aromatic residue and M represents an alkali-metal, and a polychlorinated hydrocarbon having the formula, R'—CHCl₂, wherein R' represents a member of the group consisting of hydrogen, alkyl, and hydrocarbon-substituted alkyl groups, such product being substantially free from a free phenol, and being transformable by heat into an infusible, insoluble body.

23. In a method of making a plastic composition, the step which consists in reacting methylene dichloride with a phenolic salt having the general formula, R—O—M, wherein R represents an aromatic residue and M represents a metal selected from the class consisting of alkali and alkaline-earth metals, said reaction being carried out in the presence of water.

CARL F. PRUTTON.